Nov. 18, 1958 M. E. BROOKS 2,860,931
ROLL NECK BEARING SEALS
Filed Sept. 11, 1956 4 Sheets-Sheet 1
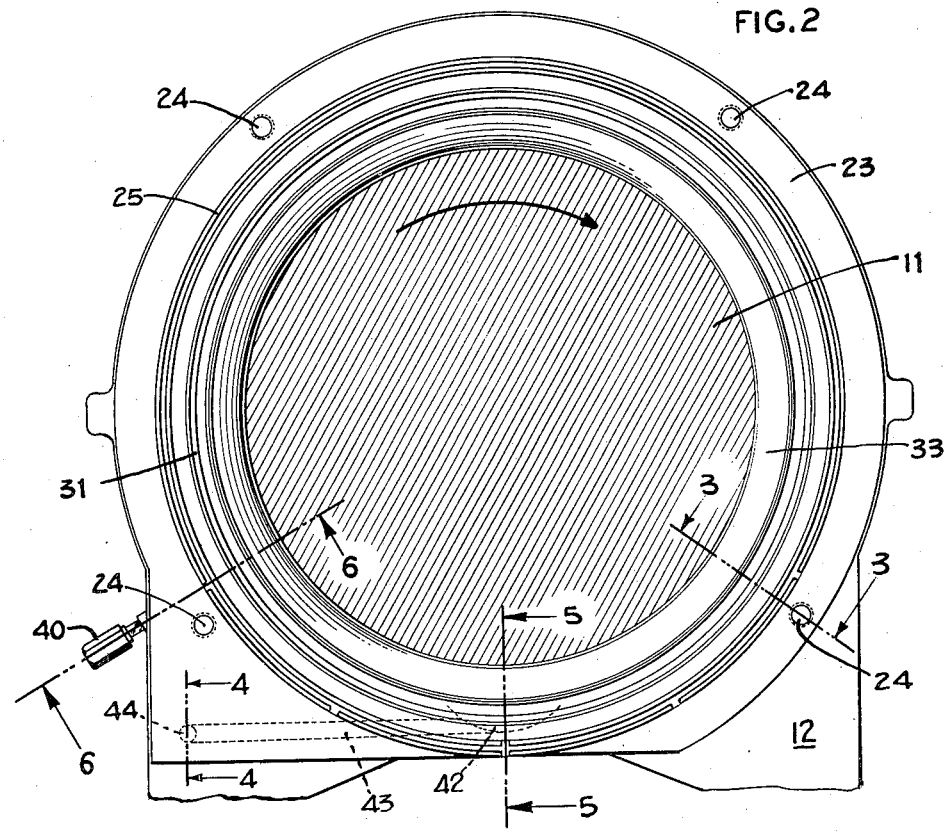
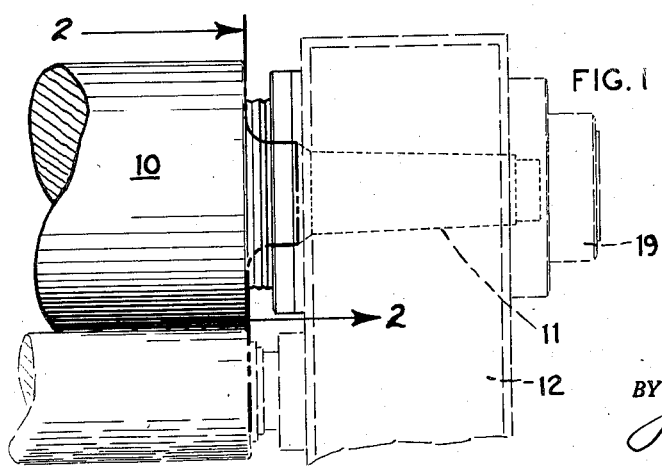
INVENTOR.
MOSES E. BROOKS
BY
Robert T. Teeter Nov. 18, 1958  M. E. BROOKS  2,860,931
ROLL NECK BEARING SEALS
Filed Sept. 11, 1956  4 Sheets-Sheet 2
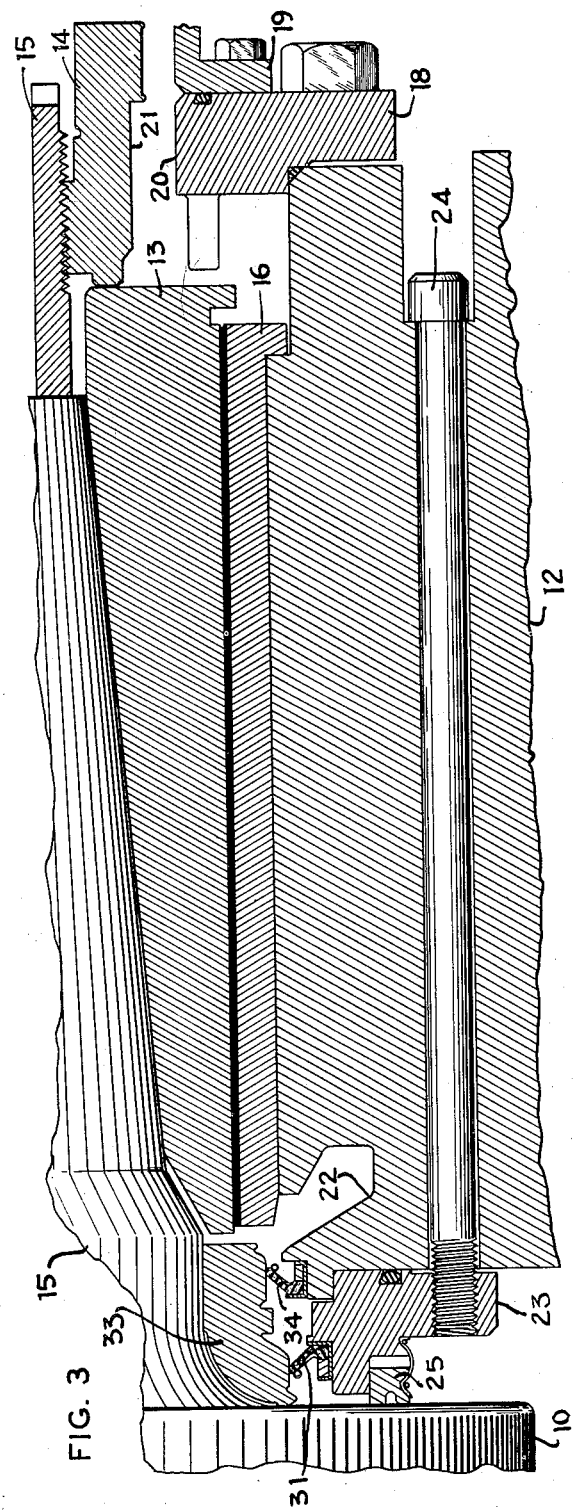
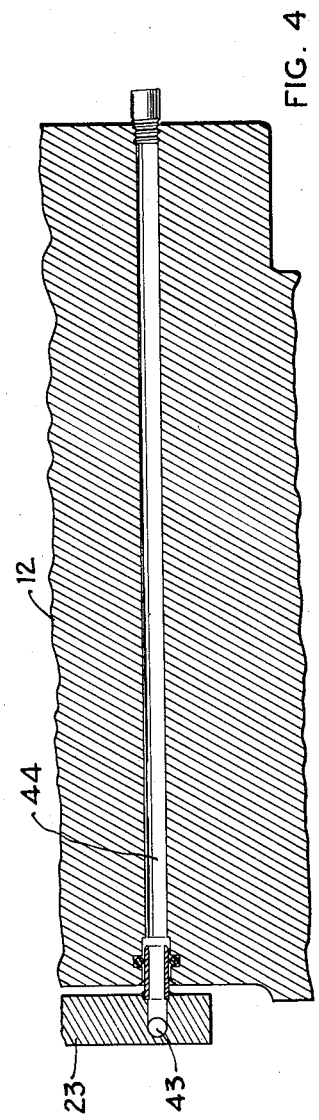
INVENTOR.
MOSES E. BROOKS
BY
Robert T. Teeter Nov. 18, 1958  M. E. BROOKS  2,860,931
ROLL NECK BEARING SEALS
Filed Sept. 11, 1956  4 Sheets-Sheet 3

INVENTOR.
MOSES E. BROOKS
BY
Robert T. Teeter

Nov. 18, 1958   M. E. BROOKS   2,860,931
ROLL NECK BEARING SEALS
Filed Sept. 11, 1956   4 Sheets-Sheet 4

INVENTOR.
MOSES E. BROOKS
BY
Robert T. Teeter

2,860,931
Patented Nov. 18, 1958

2,860,931

ROLL NECK BEARING SEALS

Moses E. Brooks, Pittsburgh, Pa., assignor to Aluminum Company of America, Pittsburgh, Pa., a corporation of Pennsylvania Application September 11, 1956, Serial No. 609,138

3 Claims. (Cl. 308—36.1)

This invention relates to roll neck bearing seals for rolling mills, and to a novel sealing arrangement for excluding roll coolants from roll neck bearing lubricants and for preventing bearing lubricants from contaminating roll coolants.

It is an object of the invention to provide an improved roll neck bearing sealing arrangement, particularly one employing a roll coolant seal and a bearing lubricant seal in tandem, with opposed relationship and with a wiping device and drain provided therebetween. Further it is an object of the invention to provide a seal mounting ring on the inner or roll end face of a roll neck bearing chuck, which may be separately assembled over the roll neck in advance of the chuck and secured to the chuck by through bolts or other securing means accessible from the outer face of the chuck.

In rolling mills, particularly those for hot and cold rolling of metal strip, it is often necessary to flood the roll barrel with large quantities of roll coolant, and at the same time it is necessary to provide a lubricant of different controlled characteristics for the roll neck bearings. Coolant seals are provided for the purpose of preventing roll coolant and foreign material from entering the bearing chuck, and bearing seals are provided for the purpose of preventing the bearing lubricant from leaking out of the bearing chuck. Despite great efforts in the past, such seals inevitably fail to perform satisfactorily under all operating conditions. In other words, they will leak, eventually if not immediately. Sometimes the bearing lubricant will leak into the roll coolant system and sometimes the roll coolant will leak into the bearing lubricant system. When bearing lubricant leaks into the roll coolant system, the contamination affects the rolling characteristics of the coolant and often results in staining or damaging the metal being rolled. When roll coolant leaks into the bearing lubricant system, then the bearing lubricant becomes contaminated, usually being reduced in viscosity, and the life of the bearing is endangered.

In the past many efforts have been made to avoid leakage through coolant and bearing seals. These efforts have included duplication of the sealing elements for either or both purposes, or the provision of air pressure between the sealing elements so as to minimize the tendency toward leakage. The emphasis has been on efforts to prevent the seals from leaking, but it is the experience of rolling mill operators that even the best seal arrangements still permit leakage to take place.

Realizing that leakage of roll coolant and bearing lubricant past roll neck seals is more or less inevitable, I space such seals apart somewhat and provide a drain between them and passageways to a separate waste container. Further, in order to draw off coolant or lubricant clinging to the rotating surfaces between the seals I provide flinger edges on the sealing surfaces and a wiping device operating against the rotating surface between the seals to remove any coolant or lubricant passing into the space between the seals. By this arrangement I reduce the likelihood of any roll coolant and bearing lubricant intermingling in the recirculatory systems for either.

A further problem that has usually plagued rolling mill maintenance personnel is that of being uncertain as to whether the lips of the coolant seals, in particular, are properly disposed on the sealing surface. In the past, the difficulty is that when pushing the roll neck bearing onto the roll neck the lip of the coolant seal is frequently turned backward on itself. At times the lip along only a portion of the circumference would be turned backward on itself and the remainder of the lip would remain properly disposed. For best results the lip of the coolant seal should be and remain turned in the direction of the roll barrel. In most designs used in the past these seals can not be inspected without removing the bearing from the roll neck. To overcome this difficulty I provide a separate seal mounting ring on the inner or roll end face of the chuck. In it I locate the coolant seal, which usually has a lip facing toward the shoulder or barrel of the roll. This ring and seal can be mounted first and the seal inspected in operating position. Thereafter the chuck and bearing can be assembled over the roll neck and the seal mounting ring drawn up against the inner or roll end face of the chuck by through bolts or other securing means accessible at or through the outer face of the chuck. With this arrangement the mechanic or millright need not work blindly when placing the seals and chuck assembly on the roll neck.

With the roll neck sealing arrangement of this invention, leakage of either roll coolant or bearing lubricant past the corresponding seal for the same merely results in waste of some small amount of either coolant or lubricant or both. Further the effectiveness of the seals can be constantly determined by noting the amount of leakage going into the waste container from any particular sealing area. When the leakage becomes objectionable that fact can be readily noted and steps taken to remedy the situation, by correcting the defective sealing condition.

In the accompanying drawings:

Fig. 1 is a front elevation of a portion of a top backing roll of a four-high rolling mill, with an outline of a bearing chuck on the backing roll neck and an outline of a work roll below;

Fig. 2 is an enlarged inboard elevation of a top backing roll chuck and seals, with a section taken through the backing roll neck on line 2—2 of Fig. 1;

Fig. 3 is an enlarged section taken on line 3—3 of Fig. 2, showing the roll neck seal arrangement and chuck assembly;

Fig. 4 is a section taken on line 4—4 of Fig. 2, showing part of the waste oil drain;

Figure 5:
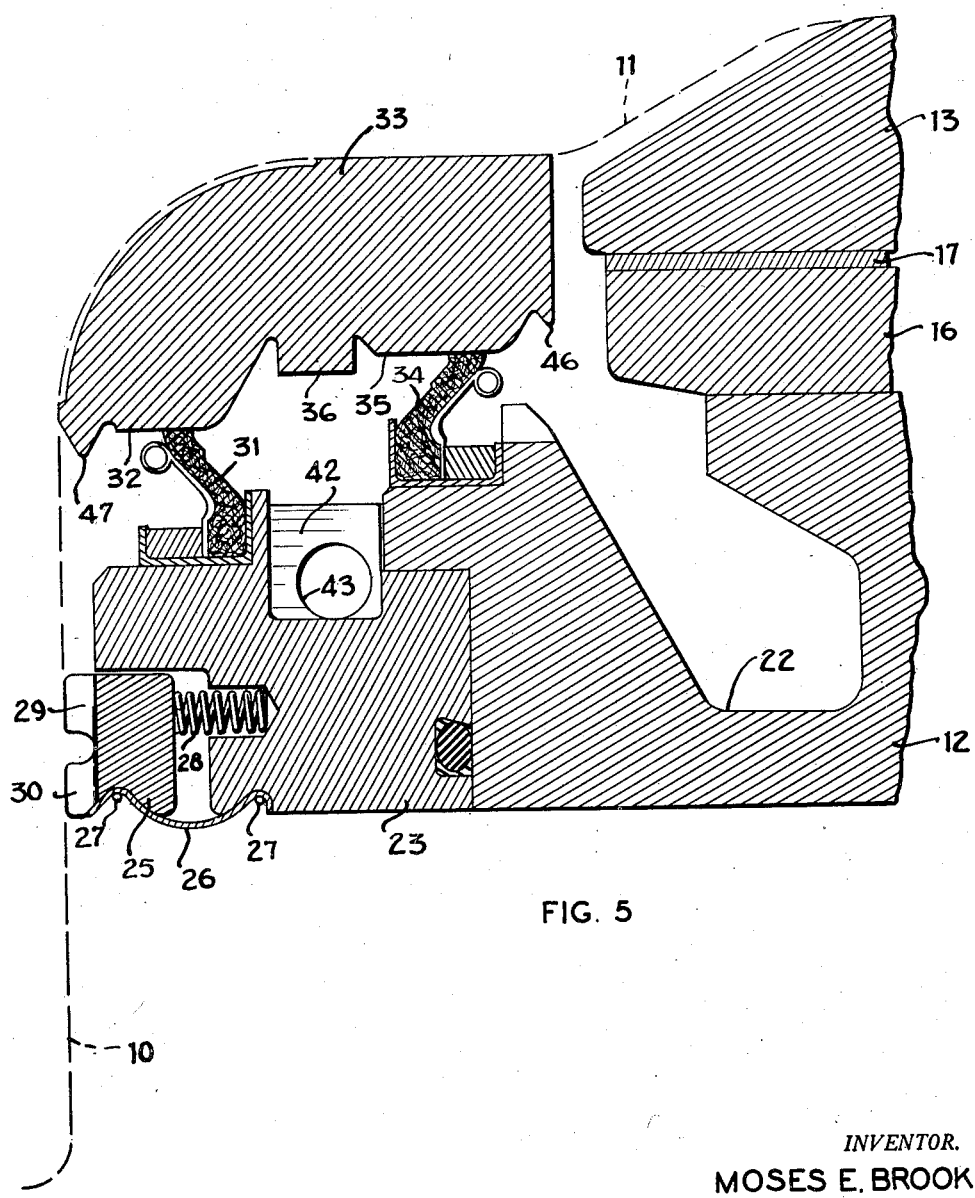
Fig. 5 is an enlarged partial section taken on line 5—5 of Fig. 2, showing the roll neck seal arrangement at the bottom.

The drawings depict one illustrative embodiment of the invention, as applied to the inner or roll face of a top backing roll bearing chuck of a four-high mill; but it is to be understood that the sealing arrangement of the invention may be employed at both ends of a roll neck, on top and bottom rolls, and on driven or undriven rolls of two-high, three-high and other types of rolling mills. Further, the drawings depict the invention as applied to a roll with a plain, sleeve-type bearing, on a tapered roll neck, of the type generally described in U. S. Patent 2,018,055; but it is to be understood that the invention may be applied to rolls with cylindrical necks and to rolls with roller or other types of roll neck bearings.

As shown in the drawings, top backing roll 10 (Fig. 1) has roll neck 11 supported in chuck 12. Roll neck 11 (Fig. 3) has a tapered portion over which an internally tapered sleeve 13 is mounted and suitably keyed, being held by lock nut 14, turned up on split ring 15 at the outer end of roll neck 11. Sleeve 13 becomes the roll neck bearing journal, rotating in bushing 16 which has a bearing metal lining 17 (Figs. 3, 5 and 6), the bushing 16 being fitted in the bore of chuck 12. The outer end of the roll neck 11 and the bore of the chuck 12 at its outer face are conveniently enclosed by the end plate 18, end cover 19 and suitable gaskets (Fig. 3), the cover 19 (Fig. 1) being a complete end bell or "hat" so that no roll neck seals are required at this end of chuck 12. If desired, however, as with a driven roll, a suitable roll neck seal or seals could be employed between the surfaces 20 of the end plate 18 and the surface 21 of the lock nut 14 at the outer face of the chuck, either in conventional manner or after the manner of the seal arrangement hereinafter particularly described with reference to the inner or roll face of the chuck.

The bearing depicted in Fig. 3 is ordinarily flood lubricated with a viscous oil supplied to the "no load" zone of bushing 16, through passages not shown. The oil escapes at each end of bushing 16 and sleeve 13, and most of it readily returns by gravity to the bearing oil tank, through passages not shown. One oil pocket 22 communicating to a drain passage is, however, shown at the left in Fig. 3. The roll neck seal arrangement for excluding contaminants and preventing intermingling of bearing lubricant and roll coolant at the inner face of the chuck 12 will now be described.

Figure 6:
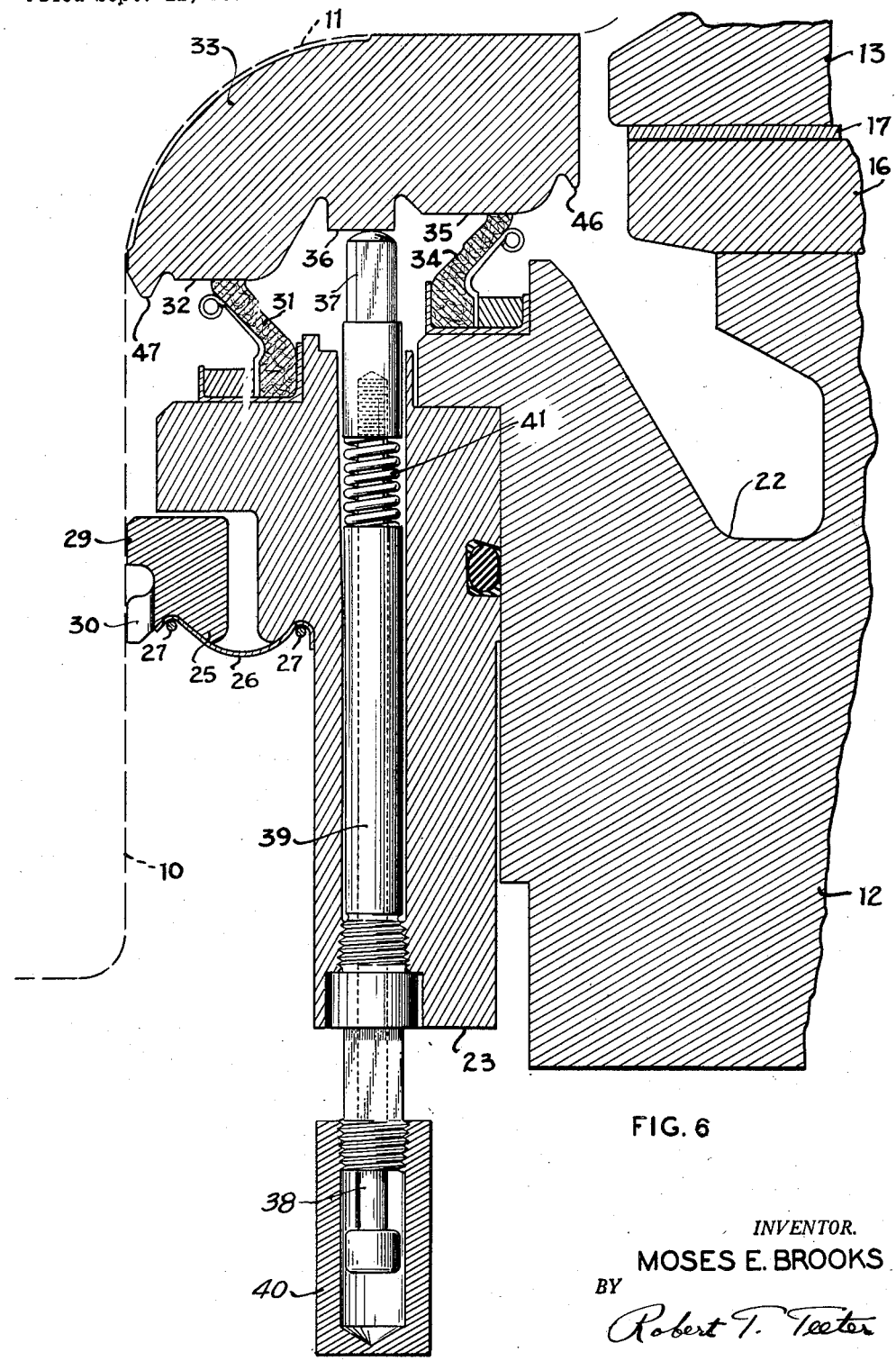
Fig. 6 is an enlarged partial section taken on line 6—6 of Fig. 2, showing the inboard roll neck seal and wiper arrangement.

On the inner face of chuck 12 (Figs. 2 and 3) is a seal mounting ring 23, conveniently secured against the face of the chuck 12 by four through bolts 24 and a suitable gasket, the heads of bolts 24 being accessible from the outer face of chuck 12 (Fig. 3). On an inner face of seal mounting ring 23 a conventional shoulder seal 25 (Figs. 2 and 3) is preferably employed. It may be made of bronze or the like, and provided with a flexible boot 26 (Figs. 5 and 6), extending from seal 25 to ring 23 and held by wires 27. The shoulder seal 25 is held against rotation by dowels (not shown) extending into ring 23, and is pressed from ring 23 against the shoulder or vertical end face of the roll barrel by a series of coiled springs 28 (Fig. 5). The shoulder seal 25 is conveniently slotted through both inner lip 29 and outer lip 30 at the bottom (Figs. 2 and 5), and only through the outer lip 30 at several other locations near the bottom (Figs. 2 and 6). The function of seal 25 is to generally exclude, as far as practical, roll coolant and foreign matter from traveling down the shoulder or vertical end face of the roll barrel into the inner roll neck sealing area. Any coolant that does pass within seal 25 is permitted to pass on out through the lip slots at the lower part thereof.

Within a counterbore of seal mounting ring 23 is a roll coolant seal 31 (Figs. 2 and 3) having its sealing lip facing toward the roll barrel (away from the bearing chuck) and, therefore, tending primarily to exclude roll coolant. Its lip is so disposed as to contact a smooth, cylindrical sealing surface 32 associated with the inner end of the roll neck 11, and preferably formed on a separate roll neck ring 33. This roll neck ring 33 may be separately made, and shrunk on the roll neck at the fillet. However, it may be an integral part of the roll neck, if desired, or of the sleeve 13 if the latter is suitably sealed. The mounting of seal 31 in ring 23, which is preferably separable from chuck 12, permits ring 23 and seal 31 to be assembled on roll neck ring 33 over the incline leading to surface 32, before chuck 12 is mounted on the roll neck. Thus, the lip of seal 31 may be inspected in operating position before the chuck 12 is mounted on the roll neck.

Within a counterbore in chuck 12 is a bearing lubricant seal 34 in tandem relation to seal 31, having its sealing lip facing toward the interior of the bearing chuck (away from the roll barrel), and, therefore, tending primarily to confine bearing lubricant within chuck 12. Its lip is preferably so disposed to contact another cylindrical surface 35, preceded by a smooth incline on roll neck ring 33, which surface 35 is preferably spaced apart from, and smaller in diameter than, surface 32. The mounting of seal 34 in chuck 12 permits chuck 12 and seal 34 to be mounted on the roll neck after seal mounting ring 23 and seal 31 have been assembled over roll neck ring 33 and inspected in place. The smaller diameter of cylindrical surface 35 permits the lip of seal 31 to pass over it freely, and the inclined surface leading to surface 35 readily accepts the smaller lip of seal 34. When both ring 23 and chuck 12 have been mounted over the roll neck, bolts 24 are inserted and drawn up to complete the roll neck bearing chuck assembly.

Between surfaces 32 and 35 of roll neck ring 33 there is preferably a projecting cylindrical wiping surface 36 of intermediate diameter, the edges of which function as flingers (Fig. 6). At a convenient position, preferably near the bottom of ring 23 but on the ascending side and below the horizontal centerline with reference to rotation of the wiping surface, a finger-like, radially mounted wiping device 37, preferably of bronze, nylon, or other low friction material, is advantageously disposed to contact wiping surface 36. It is supported on a stem 38 slidable in a guide 39, and provided with an end cover 40 (Figs. 2 and 6). The guide 39 is screwed into a tapped portion of a radial hole in ring 23. A coiled spring 41 around the inner end of stem 38, between the inner end of guide 39 and the wiping device or wiper 37, presses wiper 37 against wiping surface 36. Wiper 37 is removed by unscrewing guide 39. It may be put into place after ring 23 and chuck 12 have been mounted over the roll neck and drawn together by bolts 24.

Wiper 37 will wipe off surface 36, any coolant and lubricant fluids leaking past seals 31 and 34. Such fluids will collect, whether by wiping, flinging or simple gravitation, in the waste sump 42 (Figs. 2 and 5) conveniently provided in the bottom of ring 23, beneath wiping surface 36. From thence they will drain through passages 43 and 44 (Figs. 2, 4 and 5), preferably to the outer face of the chuck 12 and to any desired waste container or tank (not shown).

It will be noted that roll neck ring 33, even surface 35 thereof, projects beyond the diameter of the sleeve 13, so that bearing lubricant will not tend to squirt against seal 34. A flinger edge 46 is desirably located on the outer edge of ring 33, opposite the bushing 16. Similarly a flinger edge 47 is desirably located on the inner edge of ring 33, against the shoulder or vertical end face of the roll barrel. These flinger edges 46 and 47 help to throw off bearing lubricant and roll coolant, respectively, when such fluids find their way toward seals 34 and 31, respectively.

The embodiment of the invention depicted in the drawings is preferably employed as follows. Seal mounting ring 23, with shoulder seal 25 and roll coolant seal 31 mounted therein, is passed over roll neck 11. Shoulder seal 25 ultimately abuts the shoulder or vertical end face of the roll barrel. Coolant seal 31 passes freely over all portions of roll neck ring 33 until it approaches cylindrical surface 32. At that point care is taken to assure seating of the lip of seal 31 on that surface with the lip properly disposed. A suitable mounting rig may be conveniently employed to carry and hold ring 23 in this position, and the seals 25 and 31 may be finally inspected before the chuck 12 is mounted on the roll neck.

Next, chuck 12, bushing 16 and sleeve 13, with bearing lubricant seal 34 mounted in chuck 12, is assembled over roll neck 11. Lubricant seal 34 passes easily onto cylindrical surface 35. Ring 23 and chuck 12 are aligned, and through bolts 24 inserted and drawn up. Wiper 37 is inserted and held in place by stem guide 39 being screwed into place. After similarly mounting the ring and chuck on the other roll neck, the roll is ready for installation in the mill. At the mill, drain passage 44 may be connected by pipe or hose to a suitable waste container.

In the mill installation, shoulder seal 25 deflects the flood of roll coolant away from the other seals. Flinger edges 47 and 46 tend to keep seeping fluids away from seals 31 and 34, respectively. Seal 31 tends to keep coolant from entering chuck 12, and seal 34 tends to keep lubricant from leaving chuck 12. Since seals are never perfect, and subject to failure, either coolant or lubricant may find its way between seals 31 and 34. From this area either or both fluids are flung, wiped and drained. Flinger edges of wiping surface 36 throw off lubricant or coolant. More viscous or sticky oils and the like are removed from surface 36 by wiper 37. The fluids reaching the area between seals 31 and 34 are thus collected and caused to drain away through waste sump 42, passages 43 and 44, independently of the separate conventional roll coolant and bearing lubricant systems.

When chuck 12 is to be dismounted from the roll 10, wiper 37 is best removed, but seal mounting ring 23 need not be separated at this time from chuck 12, unless desired. Thus, the roll bearing, chuck and seals may be readily and easily handled, both during assembly and dis-assembly.

Various modifications may, of course, be made in the employment of the sealing arrangement of this invention, in accordance with the appended claims.

What is claimed is:

1. A bearing seal arrangement for a rolling mill roll neck and its bearing chuck, comprising a bearing chuck, roll coolant and bearing lubricant seals associated with at least one end of said chuck, each disposed to contact a cylindrical sealing surface associated with the corresponding end of a roll neck, a spring pressed wiping device mounted between said seals below the horizontal centerline of said chuck and disposed to contact a cylindrical wiping surface associated with the roll neck, and a bottom drain between said seals for discharging to waste any fluid leaking past either of said seals.

2. A bearing seal arrangement for a rolling mill roll neck and its bearing chuck, comprising a bearing chuck, a separate seal mounting ring assembled with the inner end face of said chuck by securing means accessible at the outer end face of said chuck, roll coolant and bearing lubricant seals located in said seal mounting ring and in the inner end of said chuck, respectively, each disposed to contact a cylindrical sealing surface associated with the inner end of the roll neck, a spring pressed wiping device mounted between said seals below the horizontal centerline of said seal mounting ring and said chuck and disposed to contact a cylindrical wiping surface associated with the roll neck, and a bottom drain from the assembly of said seal mounting ring and said chuck, between said seals, for discharging to waste any fluid leaking past either of said seals.

3. A bearing seal arrangement for a rolling mill roll neck and its bearing chuck, comprising a bearing chuck, a separate seal mounting ring assembled with the inner end face of said chuck by securing means accessible at the outer end face of said chuck, roll coolant and bearing lubricant seals located in said seal mounting ring and in the inner end of said chuck, respectively, each disposed to contact a cylindrical sealing surface associated with the inner end of the roll neck, a spring pressed wiping device radially mounted between said seals and below the horizontal centerline of said seal mounting ring and said chuck and disposed to contact a cylindrical wiping surface associated with the roll neck and of diameter intermediate that of said seals, said coolant seal having a lip facing away from said chuck, said lubricant seal having a lip facing toward the interior of said chuck and being of smaller diameter than said coolant seal, and a bottom drain from the assembly of said seal mounting ring and said chuck, between said seals, for discharging to waste any fluid leaking past either of said seals.

References Cited in the file of this patent

UNITED STATES PATENTS

| Number | Name | Date |
|---|---|---|
| 2,243,009 | Kingsbury et al. | May 20, 1941 |
| 2,243,010 | Iversen | May 20, 1941 |